(12) United States Patent
Bowen et al.

(10) Patent No.: US 12,306,070 B2
(45) Date of Patent: May 20, 2025

(54) METHODS AND SYSTEMS TO INTERNALLY AND EXTERNALLY LOCATE OBSTRUCTIONS AND LEAKS IN CONVEYANCE PIPE

(71) Applicant: SonDance Solutions LLC, Pinehurst, TX (US)

(72) Inventors: Jay C Bowen, Pinehurst, TX (US); Jeffery M Wilkinson, Spring, TX (US); Cris K Weber, Austin, TX (US)

(73) Assignee: SonDance Solutions LLC, Pinehurst, TX (US)

( * ) Notice: Subject to any disclaimer, the term of this patent is extended or adjusted under 35 U.S.C. 154(b) by 40 days.

(21) Appl. No.: 17/512,418

(22) Filed: Oct. 27, 2021

(65) Prior Publication Data

US 2022/0128427 A1 Apr. 28, 2022

Related U.S. Application Data

(60) Provisional application No. 63/203,843, filed on Aug. 2, 2021, provisional application No. 63/154,026, filed
(Continued)

(51) Int. Cl.
*G01M 3/24* (2006.01)
*G01S 11/16* (2006.01)

(52) U.S. Cl.
CPC .............. *G01M 3/243* (2013.01); *G01S 11/16* (2013.01)

(58) Field of Classification Search
None
See application file for complete search history.

(56) References Cited

U.S. PATENT DOCUMENTS 4,947,683 A * 8/1990 Minear ................. E21B 47/107
  73/152.32
4,996,879 A * 3/1991 Kruka ................... G01M 3/243
  73/592
(Continued)

FOREIGN PATENT DOCUMENTS

CN  104295907 A  1/2015
WO  2020162964 A1  8/2020

OTHER PUBLICATIONS

Papadopoulou, K. A., et al. "An evaluation of acoustic reflectometry for leakage and blockage detection." Proceedings of the Institution of Mechanical Engineers, Part C: Journal of Mechanical Engineering Science 222.6 (2008): 959-966. (Year: 2008).*
(Continued)

*Primary Examiner* — Isam A Alsomiri
*Assistant Examiner* — Jonathan D Armstrong
(74) *Attorney, Agent, or Firm* — K&L Gates LLP

(57) ABSTRACT

Systems and methods for locating an obstruction or leak in a conveyance. The systems include an emitter operable to emit a signal or signals through the conveyance. The systems further include a receiver operable to receive a reflected signal or signals from the obstruction or leak. The systems further include a processor programmed to analyze the received reflected signal and determine the location of the obstruction or leak in the conveyance. The methods include emitting a signal or signals from an emitter through the conveyance, receiving a reflected signal or signals reflected from the obstruction or leak with a receiver, and analyzing the received reflected signal or signals using a processor to determine the location of the obstruction or leak in the conveyance.

14 Claims, 11 Drawing Sheets

Related U.S. Application Data on Feb. 26, 2021, provisional application No. 63/106,269, filed on Oct. 27, 2020.

(56) References Cited

U.S. PATENT DOCUMENTS

| | | | |
|---|---|---|---|
| 5,675,506 A * | 10/1997 | Savic | F17D 5/06 |
| | | | 73/592 |
| 6,912,918 B1 * | 7/2005 | Lynnworth | G01N 9/002 |
| | | | 73/861.26 |
| 7,764,570 B2 * | 7/2010 | Perez | G01L 27/007 |
| | | | 367/13 |
| 8,346,492 B2 | 1/2013 | Yang et al. | |
| 9,134,277 B2 | 9/2015 | Amir et al. | |
| 9,261,484 B1 | 2/2016 | Juan et al. | |
| 9,983,092 B2 | 5/2018 | Howitt | |
| 10,168,302 B2 | 1/2019 | Lennox et al. | |
| 10,401,254 B2 | 9/2019 | Giunta et al. | |
| 10,527,514 B2 | 1/2020 | Calzavara et al. | |
| 10,928,513 B2 | 2/2021 | Martin et al. | |
| 2003/0033879 A1 * | 2/2003 | Adewumi | G01N 29/40 |
| | | | 73/627 |
| 2007/0280046 A1 | 12/2007 | Perez | |
| 2010/0059219 A1 * | 3/2010 | Roberts | E21B 47/0025 |
| | | | 166/250.01 |
| 2011/0093220 A1 * | 4/2011 | Yang | G01M 3/36 |
| | | | 702/51 |
| 2012/0312078 A1 | 12/2012 | Bakhtiar | |
| 2013/0199272 A1 * | 8/2013 | Khalifa | G01M 3/005 |
| | | | 73/40.5 A |
| 2014/0060580 A1 | 3/2014 | O'donnell et al. | |
| 2014/0154991 A1 * | 6/2014 | Brown | G01F 1/667 |
| | | | 455/42 |
| 2014/0260626 A1 | 9/2014 | Kulczyk | |
| 2014/0311245 A1 | 10/2014 | Horoshenkov et al. | |
| 2015/0000900 A1 | 1/2015 | O'malley | |
| 2016/0161940 A1 * | 6/2016 | Max | F17D 5/00 |
| | | | 700/282 |
| 2016/0258834 A1 * | 9/2016 | Al-Roubaiey | G01M 3/243 |
| 2017/0058660 A1 * | 3/2017 | Hunter | G01N 29/42 |
| 2017/0254685 A1 | 9/2017 | Wilt et al. | |
| 2017/0307466 A1 * | 10/2017 | Brennan, Jr. | G01F 1/666 |
| 2018/0217021 A1 * | 8/2018 | Lu | G01N 29/036 |
| 2019/0211669 A1 | 7/2019 | Mcmillon | |
| 2019/0390990 A1 | 12/2019 | Krywyj et al. | |
| 2020/0124494 A1 * | 4/2020 | Solomon | G06F 16/2455 |

OTHER PUBLICATIONS

Glentis, George Othon et al., Leak detection in the pipeline network of an oil refinery—A pattern classification paradigm, PCI 2020: 24th Pan-Hellenic Conference on Informatis, Nov. 20-22, 2020, pp. 178-182, US.

Glentis, George Othon et al., Study of the acoustic noise in pipelines carrying oil products in a refinery establishment, PCI '19: Proceedings of the 23rd Pan-Hellenic Conference on Informatics, Nov. 28-30, 2019, pp. 34-41, US.

International Search Report and Written Opinion dated Feb. 23, 2022 for corresponding PCT Application No. PCTUS2021056908 filed Oct. 27, 2021.

* cited by examiner

METHODS AND SYSTEMS TO INTERNALLY AND EXTERNALLY LOCATE OBSTRUCTIONS AND LEAKS IN CONVEYANCE PIPE

BACKGROUND

This section is intended to provide relevant background information to facilitate a better understanding of the various aspects of the described embodiments. Accordingly, these statements are to be read in this light and not as admissions of prior art.

Multiple industries both onshore and offshore utilize pipes for conveyance of materials, such as slurry materials, in a variety of situations. Conveyance pipes used for the transport of materials include the sewage, construction, irrigation (farms/ranches), dredging, mining, and oil & gas industries. The material in the conveyance pipe tends to obstruct the conveyance at unknown locations. Current processes of locating obstructions can be long and costly, such as a manual inspection consuming days or weeks.

The following is a description of current industry method to locate obstructions in the conveyance of material. During normal operations, material is conveyed down the pipeline. This material can adhere together and grow until the conveyance is sufficiently clogged and no material will exit at the discharge location. The current method is to shut down operations and manually inspect the conveyance between joint intervals for the obstructed section. The conveyance lines can be quite long, and the effort to repeatedly disconnect, inspect, and reconnect is costly in terms of labor-hours and in terms of non-productive time. For offshore operations, the conveyance line may be floating on the surface of the water or submerged to lie on the bottom of the body of water. Either one of these operation scenarios adds to the complexity and subsequent work required using the current state of the art for locating obstructions or leaks in the conveyance line.

Leaks have similar non-productive time issues as mentioned above for obstructions. While leaks may be visible while on shore, the processes of identifying and locating them are labor intensive. The current method for finding leaks along the conveyance is to have a labor force walk the line and visually inspect the conveyance. Once a leak is located a repair ensues. Leaks, while not as disruptive to the non-productive time as obstructions, have severe consequences on the operator because the contract for works strictly prohibits leaks of any kind during the job. It is imperative that the operator find leaks as quick as possible to avoid being shut down for noncompliance. Locating a leak offshore, especially with a submerged conveyance line, is all but impossible for the operator to locate until the leak has produced a large indicator, such as a slurry "spill" area that can be seen from the surface.

BRIEF DESCRIPTION OF THE DRAWINGS

Embodiments of the methods and systems to internally and externally locate obstructions and leaks in conveyance pipe are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

This disclosure relates to methods and systems or devices to determine the location of an obstruction or leak in the conveyance in onshore and offshore operations. The methods and systems use any single wavelength or combination of wavelengths in the electromagnetic spectrum to determine the location of an obstruction or leak in the conveyance pipe. Alternatively, the methods and systems utilize low frequency acoustic signals (i.e., a range between approximately 1 kHz to approximately 24 kHz) and high frequency acoustic signals (i.e., a range between approximately 180 kHz to approximately 220 kHz) to efficiently determine the location of any conveyance obstruction or leak.

This process is a novel use of a system or device to use an electromagnetic or acoustic signal to quickly determine the location of any conveyance pipe obstruction or leak. This quick obstruction or leak location allows the operator to proceed immediately to the location and take action to resume operations. This reduction in time significantly reduces the labor costs required to locate the obstruction or leak as well as the associated cost of non-productive time. With this new process, what today is taking the industry days and or weeks, will now take minutes and or hours.

This invention uses multiple configurations of signal sources and receivers to analyze the location of obstructions and leaks in both onshore and offshore conveyances. The conveyance may be a steel conveyance or non-steel conveyance, such as polyethylene. The conveyance can be submerged or on the surface.

As used herein, a conveyance may be a metallic tubular or non-metallic tubular, such as a polyethylene tubular or tubular made from other polymers. Further, the conveyance may be submerged or on the surface.

Figure 1:
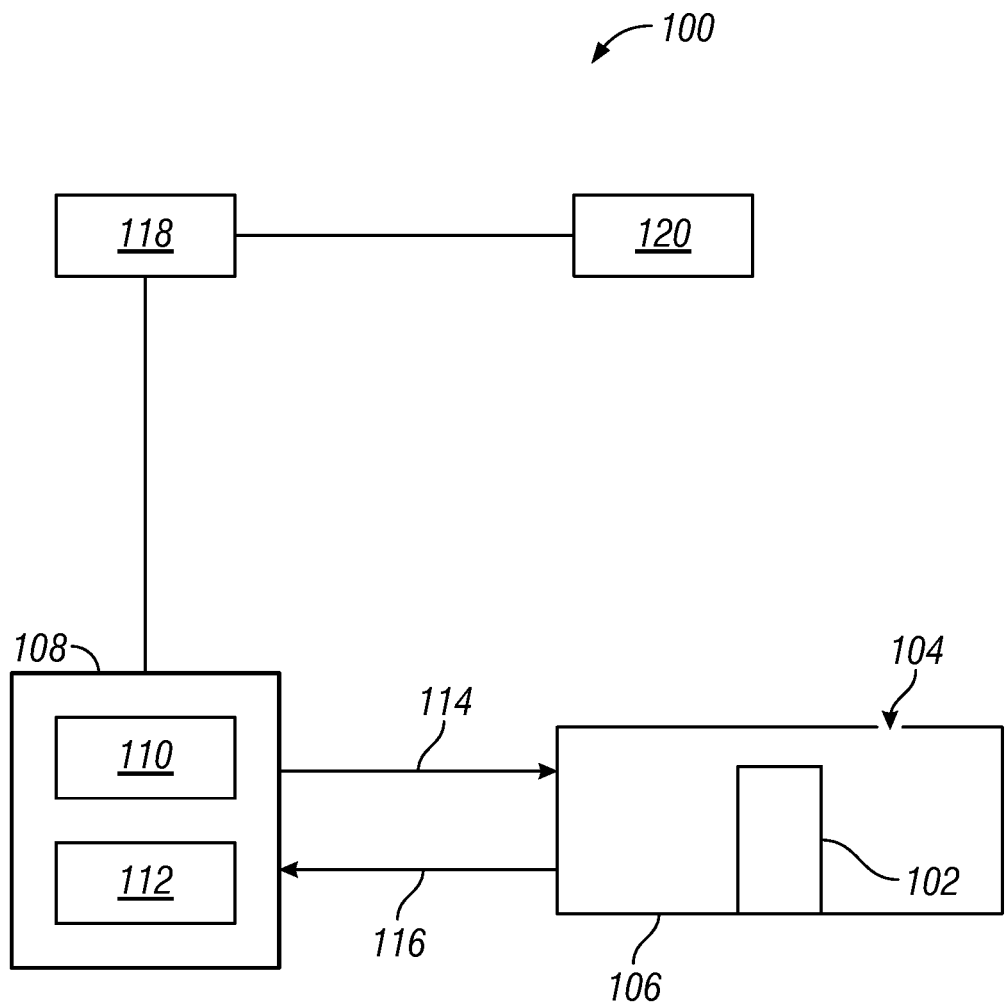
FIG. 1 is a schematic diagram of a system for locating obstructions and leaks in conveyance, according to one or more embodiments.

Turning now the figures, FIG. 1 is a system 100 for locating obstructions 102 and leaks 104 in a conveyance 106 wherein the conveyance 106 is made of a material that contains the conical spread and minimizes losses of emitted signals and filled with a fluid, according to one or more embodiments. The system 100 includes an emitter system 108 that includes an emitter 110 that may be either an electromagnetic emitter or an acoustic emitter. For example, the emitter 110 may be an acoustic emitter, such as a piezoelectric device, a piston, or other similar device operable to generate an acoustic signal. Alternatively, the emitter 110 may be electromagnetic emitter operable to generate any single wavelength or combination of wavelengths in the electromagnetic spectrum. Further, although a single emitter 110 is shown, there may also be more than one emitter 110.

The emitter system 108 further includes a receiver 112, which may either be an acoustic receiver or electromagnetic receiver depending on the signal emitted by the emitter 110. Although only one receiver 112 is shown, there may also be more than one receiver 112. Additionally, the emitter 110 and the receiver 112 may be in a common housing, as depicted in FIG. 1, or in separate housings.

As an example, if the emitter 110 is an acoustic emitter, the emitter 110 may be operable to produce both low range acoustic signals, for example, 12 kHz or 24 kHz, and high range acoustic signals, for example, 200 kHz, at different times. However, other frequencies between 1 kHz and 24 kHz may be used for low range acoustic signals and other frequencies between 180 kHz and 220 kHz may be used for high range acoustic signals. Low range acoustic signals are used to provide information over a larger area and high range acoustic signals are used to provide more detailed information than the low range acoustic signals over a smaller area. Further, although a single acoustic emitter and a single acoustic receiver 112 are depicted in FIG. 1, other embodiments may include two or more acoustic emitters, for example, a low frequency emitter and a high frequency emitter, and/or two acoustic receivers or more, for example, a low frequency receiver and a high frequency receiver.

The emitter 110 is operable to emit signals 114 through the conveyance 106 to detect an obstruction 102 or a leak 104. Once the signals 114 reach either the obstruction 102 or the leak 104, the signals 114 are reflected back to the emitter system 108 and the reflected signals 116 are received by the receiver 112. A local computer system 118 in electronic communication with and in close proximity to (e.g., within 200 ft) the acoustic receiver 112 converts the received reflected acoustic signals 116 into transmittable data that is then transmitted via wired or wireless means to a remote computer system 120 that includes a processor programmed and operable for further analysis to determine the location of the obstruction 102 and/or leak 104. Alternatively, the local computer system 118 may include a processor programmed and operable to determine the location of the obstruction 102 and/or leak 104. The local computer system 118 may optionally transmit the location of the obstruction 102 and/or leak 104 to the remote computer system 120 or to a display connected to the local computer system 118.

To determine if an obstruction 102 and/or a leak 104 is present within the conveyance 106, multiple signals may be emitted by the emitter 110 for purposes of filtering noise. For example, with an acoustic emitter, a low frequency signal and a high frequency signal are transmitted through the conveyance 106 by the emitter 110, as discussed above. A reflected high frequency signal and a reflected low frequency signal are then received by the receiver 112, as discussed above. The computer systems 118, 120 then filter out noise from the received reflected signals via an inverse square method or other noise filtering methods known to those skilled in the art.

Once the noise is filtered out from both received reflected signals, the presence of an anomaly within the conveyance 106 is determined by comparing the reflected high frequency signal with the reflected low frequency signal. In one embodiment, the computer system 118 or 120 may display a graphical representation of the reflected high frequency signal and the reflected low frequency signal and a technician may identify an anomaly based on the graphical representation. In another embodiment, a machine-learning algorithm run by either computer system 118, 120 may be trained to compare the reflected high frequency signal and the reflected low frequency signal to detect an anomaly using data from previous conveyances that have anomalies. If an anomaly is detected, a location of the anomaly is determined using a processor in either of the computer systems 118, 120 based on the time between transmitting a low frequency signal and receiving the reflected low frequency signal and the amplitude of the received reflected low frequency signal compared to the initial signal.

Once an anomaly is detected and the location of the anomaly within the conveyance 106 is determined, the location of the anomaly is compared to the structure of the conveyance 106 at that location to determine if a known feature of the conveyance 106, such as a joint, is the source of the anomaly. If there are no features of the conveyance 106 that would cause the anomaly, then it is determined that the anomaly indicates the location of an obstruction 102 and/or a leak 104.

Alternatively, or in addition to the above, the emitter 110 may emit signals through the conveyance 106 prior to performing operations using the conveyance 106 to generate initial reflected signals. Later, the emitter 110 may emit second signals that generate second received reflected signals that are received by the receiver 112. The second reflected signals are then compared to the initial reflected signals to determine if any new anomalies and, therefore, obstructions 102 and/or leaks 104, are present within the conveyance 106.

Figure 2:
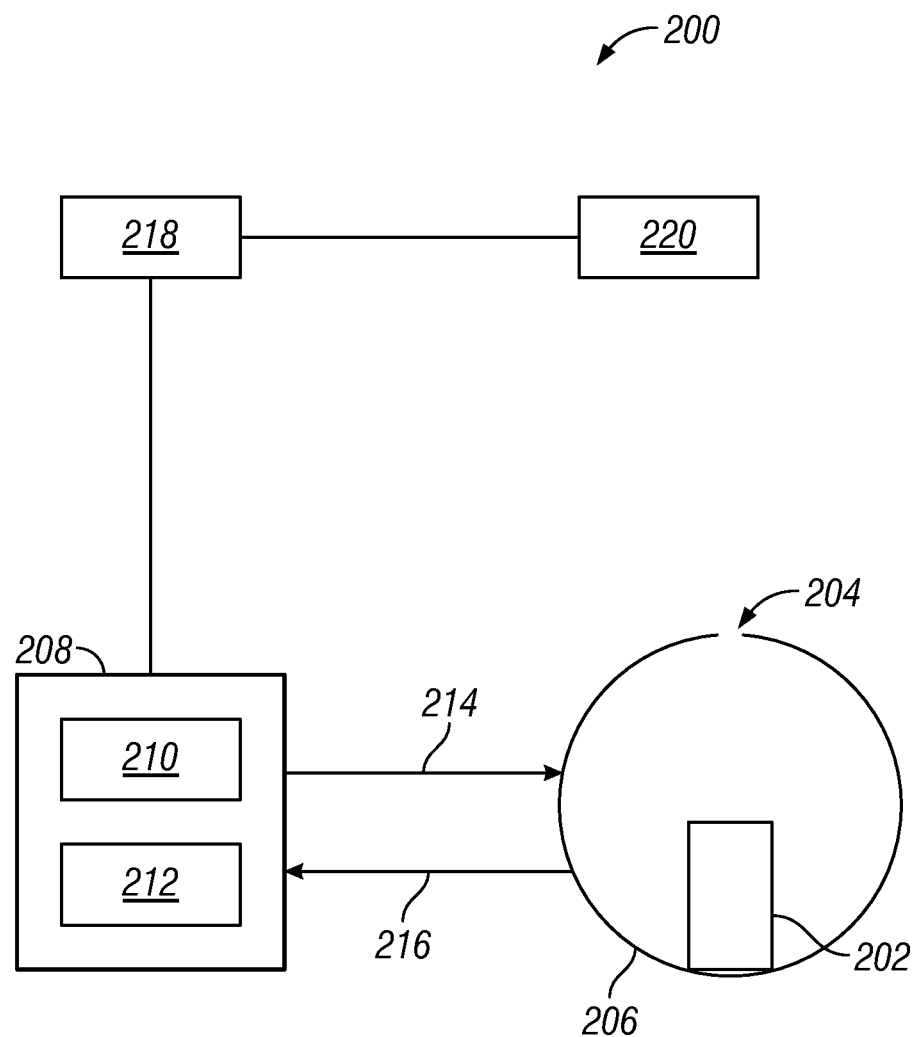
FIG. 2 is a schematic diagram of a system for locating obstructions and leaks in conveyance, according to one or more embodiments.

Turning now to FIG. 2, FIG. 2 is a schematic view of a system 200 for locating obstructions 202 and leaks 204 in a conveyance 206. FIG. 2 includes many features that are similar to the features described above with reference to FIG. 1. Accordingly, such features will not be described again in detail, except as necessary for the understanding of the system 200 shown in FIG. 2.

Similar to the system 100 described above with reference to FIG. 1, the system 200 includes an emitter system 208 that includes an emitter 210 and a receiver 212. The emitter system 208 is in electronic communication with a local computer system 218, which is in electronic communication with a remote computer system 220. Unlike the system 100 described above though, the system 200 shown in FIG. 2 does not emit signals 214 longitudinally through the conveyance 206. Instead, signals 214 are emitted perpendicularly through the conveyance 206. This allows the system 200 to detect obstructions 202 and leaks 204 in conveyances 206, whether filled with a fluid or not, whether made of a material that contains the conical spread and minimizes losses of the signals or not, and/or whether positioned such that the system 208 can emit acoustic signals 214 longitudinally within the conveyance 206 or not.

In an offshore environment, the emitter system 208 may be positioned adjacent to the conveyance 206 as shown in FIG. 2 by lowering the emitter system 208 from a marine vessel or using a remotely operated vehicle (ROV) to position the emitter system 208. Additionally, the local computer system 218 may be incorporated into the ROV or into the emitter system 208. Further, the location of a detected anomaly within the conveyance 206 is determined based on the position of the ROV.

Figure 3:
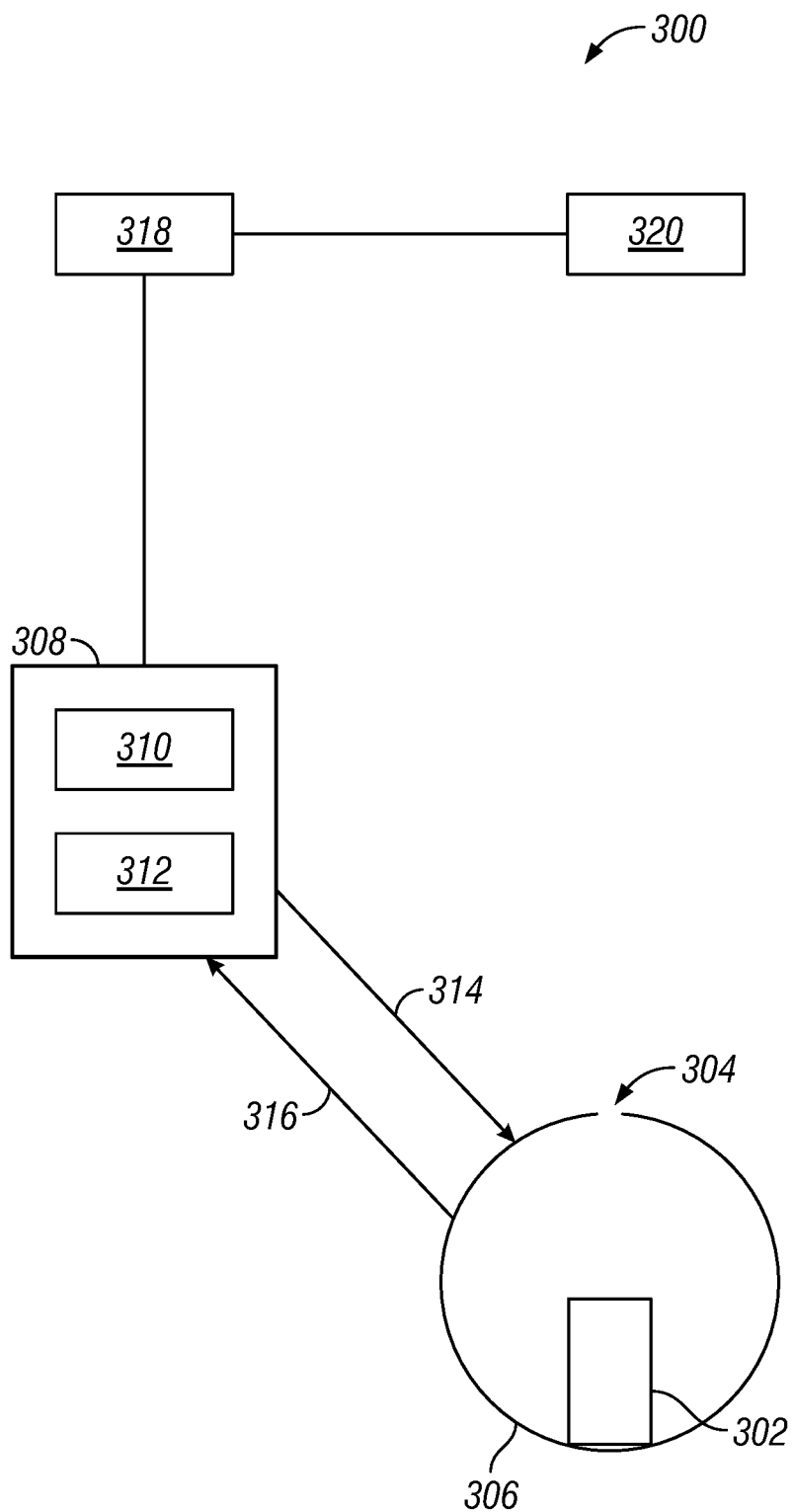
FIG. 3 is a schematic diagram of a system for locating obstructions and leaks in conveyance, according to one or more embodiments.

Turning now to FIG. 3, FIG. 3 is a schematic view of a system 300 for locating obstructions 302 and leaks 304 in a conveyance 306. FIG. 3 includes many features that are similar to the features described above with reference to FIG. 1. Accordingly, such features will not be described again in detail, except as necessary for the understanding of the system 300 shown in FIG. 3.

Like the system 100 described above with reference to FIG. 1, the system 300 includes an emitter system 308 that includes an emitter 310 and a receiver 312. The emitter system 308 is in electronic communication with a local computer system 318, which is in electronic communication with a remote computer system 320. Unlike the system 100 described above, the system 300 shown in FIG. 3 does not emit signals 314 longitudinally through the conveyance 306. Instead, signals 314 are emitted from above the conveyance 306, such as from a marine vessel above the conveyance 306. In such applications, the depth of the conveyance 306 below the marine vessel should be approximately 200 ft. (61 m) or less due the conical spread and losses of the high range acoustic signals 314 as they travel through the water.

In addition to the direction the signals are emitted from the emitter system 100, the emitter system 100 may also include alternative embodiments of number and location of emitters and receivers as discussed below.

Single Source with Single Receiver

Figure 4:
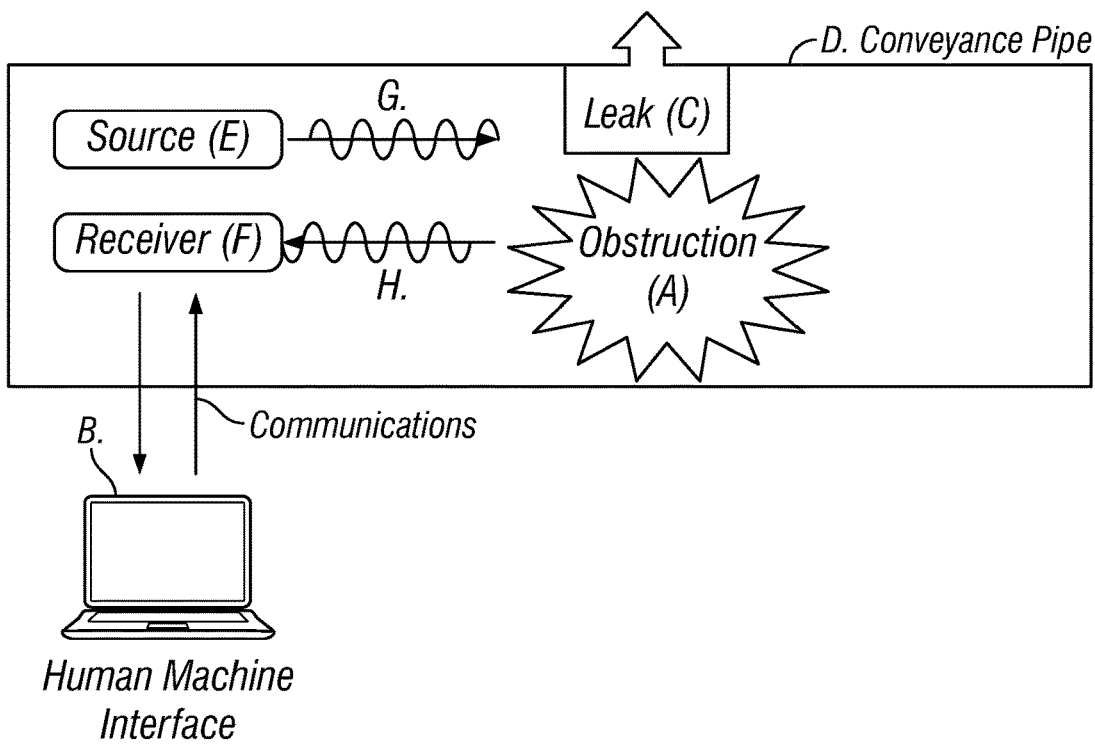
FIG. 4 is a schematic diagram of an embodiment of a method and system for locating obstructions and leaks in conveyance pipe using a single internal source with a single internal receiver.

FIG. 4 is a schematic diagram of an embodiment of a method and system for locating obstructions and leaks in conveyance pipe using a single internal source with a single internal receiver. The system includes an emitter (E) that is operable to send a signal or signals (G) within the conveyance pipe (D). For example, the emitter may be an acoustic emitter sending an acoustic signal or signals or an electromagnetic emitter sending an electromagnetic signal or signals as discussed above. Once the signal interacts with the obstruction (A) or a leak (C), a reflected signal (H) will be sent back to the receiver (F) within the conveyance pipe (D). This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 5:
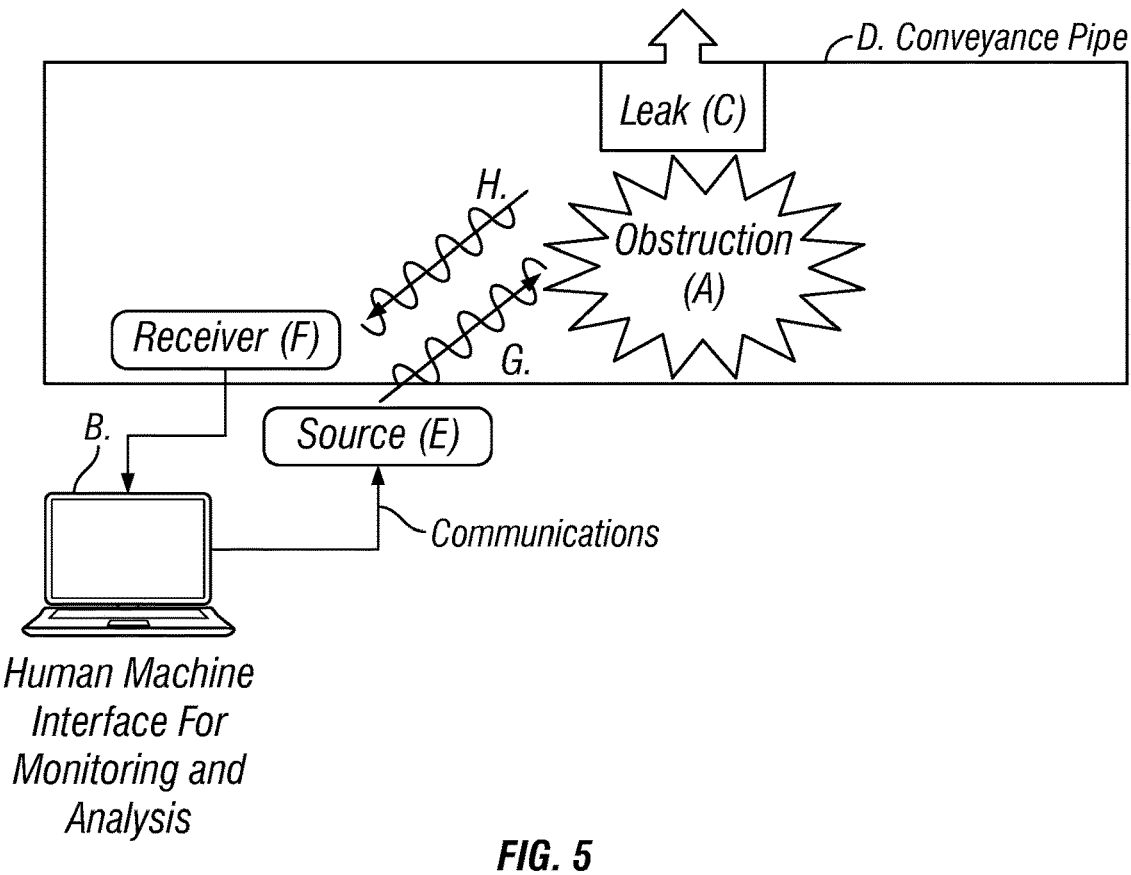
FIG. 5 is a schematic diagram of an embodiment of a method and system for locating obstructions and leaks in conveyance pipe using a single external source with a single internal receiver.

FIG. 5 is a schematic diagram of an embodiment of a method and system for locating obstructions and leaks in conveyance pipe using a single external emitter with a single internal receiver. The system includes a signal emitter (E) that is operable to send a signal or signals (G) external to the conveyance pipe (D). Once the signal interacts with the obstruction (A) or a leak (C), a reflected signal (H) will be sent back to the receiver (F) within the conveyance pipe (D). This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 6:
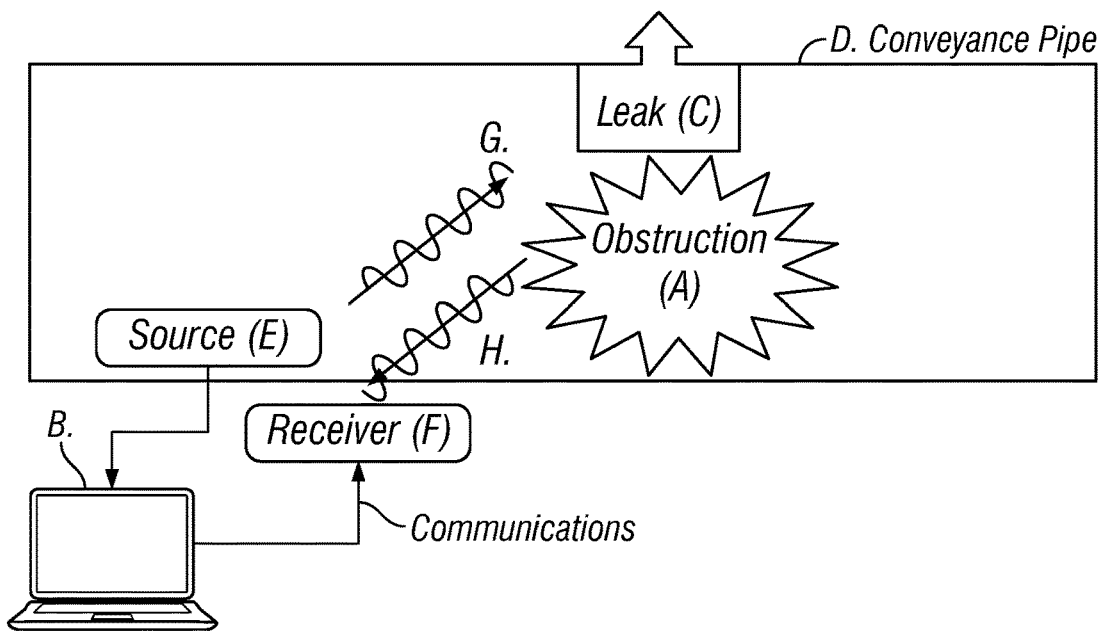
FIG. 6 is a schematic diagram of an embodiment of a method and system for locating obstructions and leaks in conveyance pipe using a single internal source with a single external receiver.

FIG. 6 is a schematic diagram of an embodiment of a method and system for locating obstructions and leaks in conveyance pipe using a single internal source with a single external receiver. The system includes an emitter (E) that is operable to send a signal or signals (G) within the conveyance pipe (D). Once the signal interacts with the obstruction (A) or a leak (C), a reflected signal (H) will be sent back to the receiver (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 7:
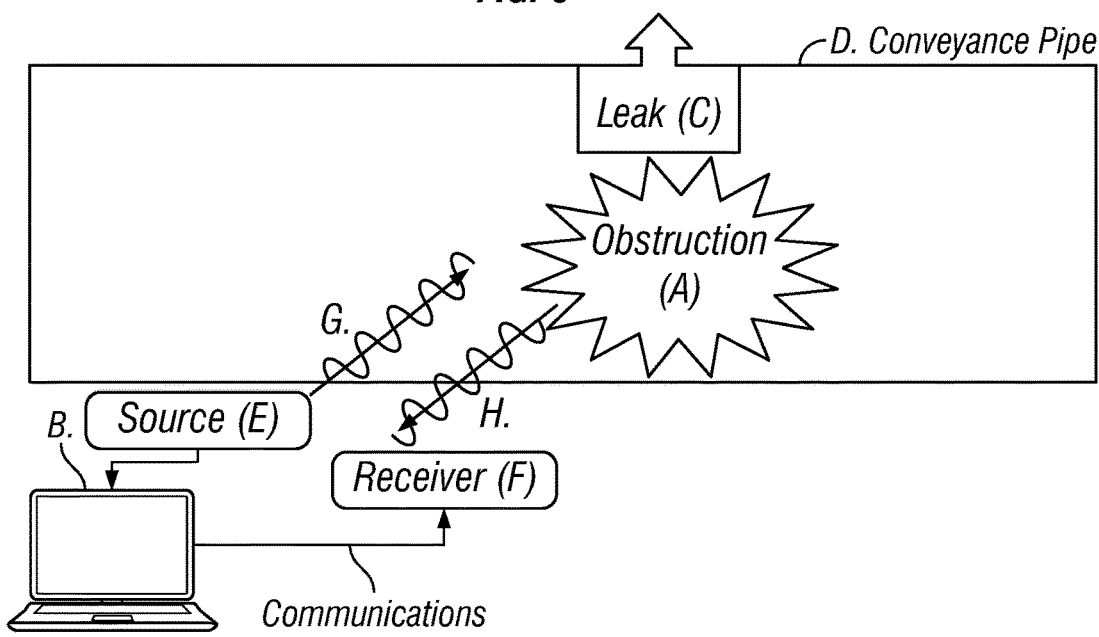
FIG. 7 is a schematic diagram of an embodiment of a method and system for locating obstructions and leaks in conveyance pipe using a single external source with a single external receiver.

FIG. 7 is a schematic diagram of an embodiment of a method and system for locating obstructions and leaks in conveyance pipe using a single external source with a single external receiver. The system includes an emitter (E) that is operable to send a signal or signals (G) external to the conveyance pipe (D). Once the signal interacts with the obstruction (A) or a leak (C), a reflected signal (H) will be sent back to the receiver (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Single Source with Multiple Receivers

Figure 8:
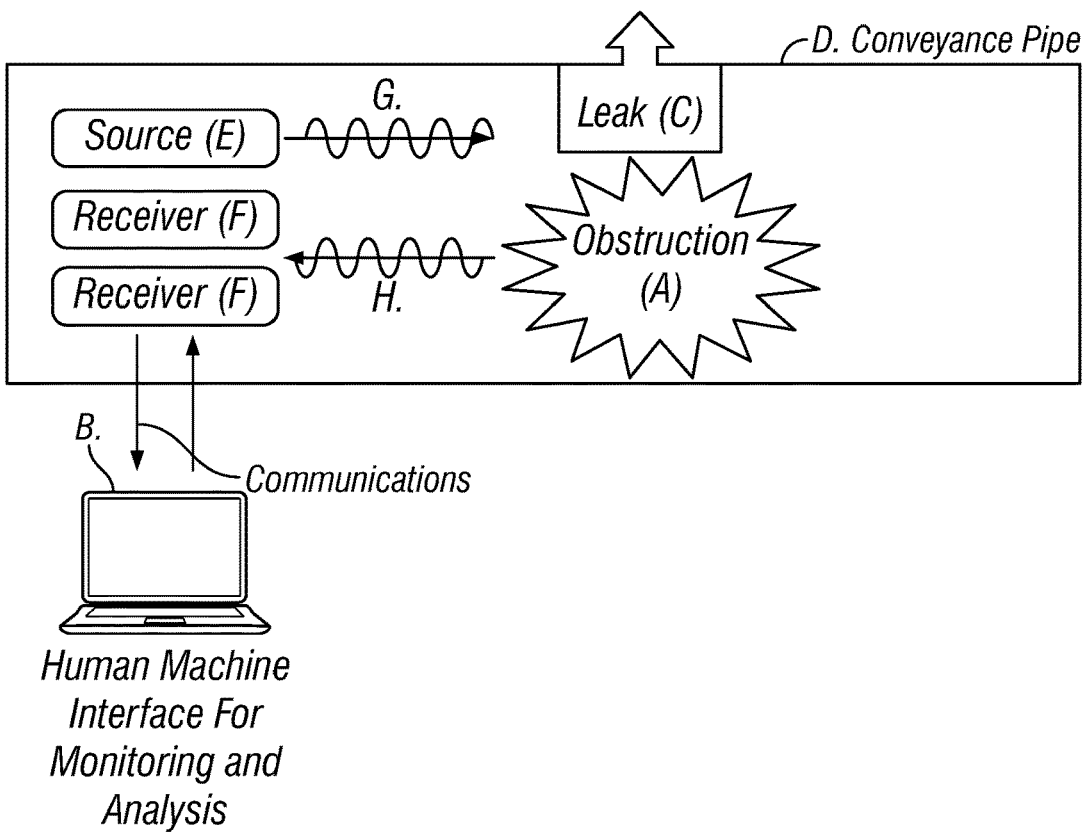
FIG. 8 is a schematic diagram of an embodiment of a method and system for locating obstructions and leaks in conveyance pipe using a single internal source with multiple internal receivers.

FIG. 8 is a schematic diagram of an embodiment of a method and system for locating obstructions and leaks in conveyance pipe using a single internal source with multiple internal receivers. The system includes an emitter (E) that is operable to send a signal or signals (G) within the conveyance pipe (D). Once the signal interacts with the obstruction (A) or a leak (C), a reflected signal (H) will be sent back to the receivers (F) within the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 9:
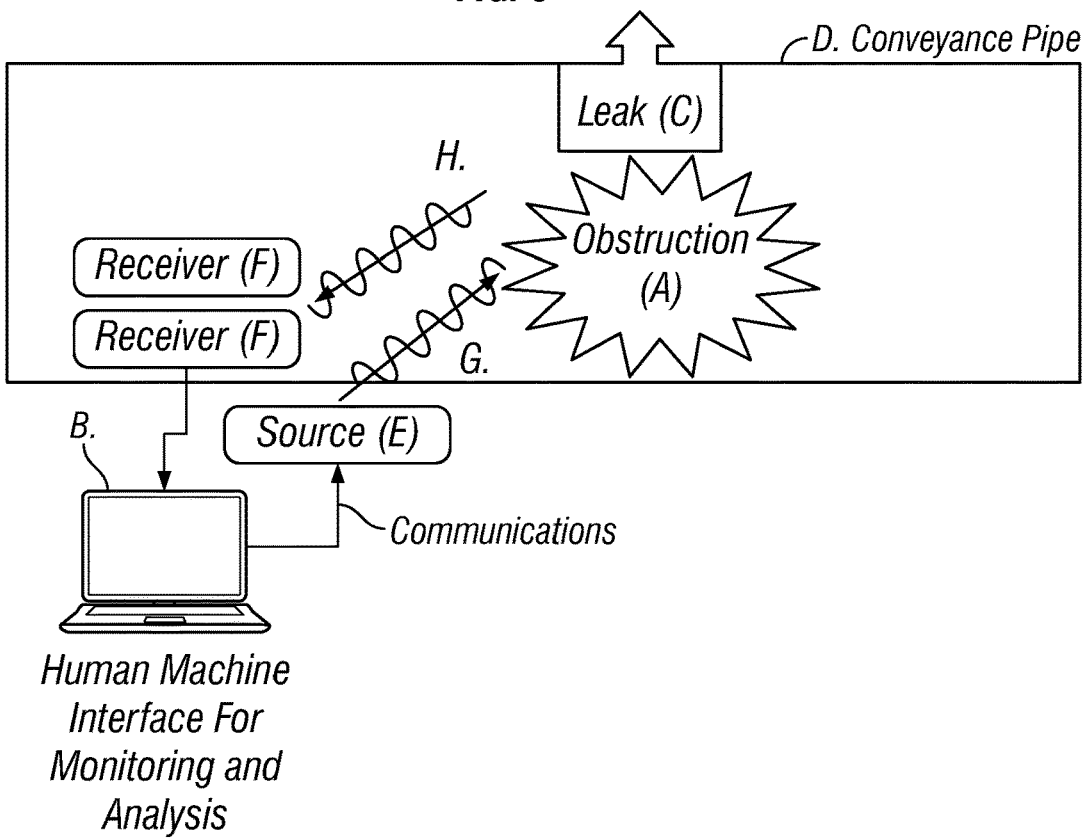
FIG. 9 is a schematic diagram of an embodiment of a method and system for locating obstructions and leaks in conveyance pipe using a single external source with multiple internal receivers.

FIG. 9 is a schematic diagram of an embodiment of a method and system for locating obstructions and leaks in conveyance pipe using a single external source with multiple internal receivers. The system includes an emitter (E) that is operable to send a signal or signals (G) external to the conveyance pipe (D). Once the signal interacts with the obstruction (A) or a leak (C), a reflected signal (H) will be sent back to the receivers (F) within the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 10:
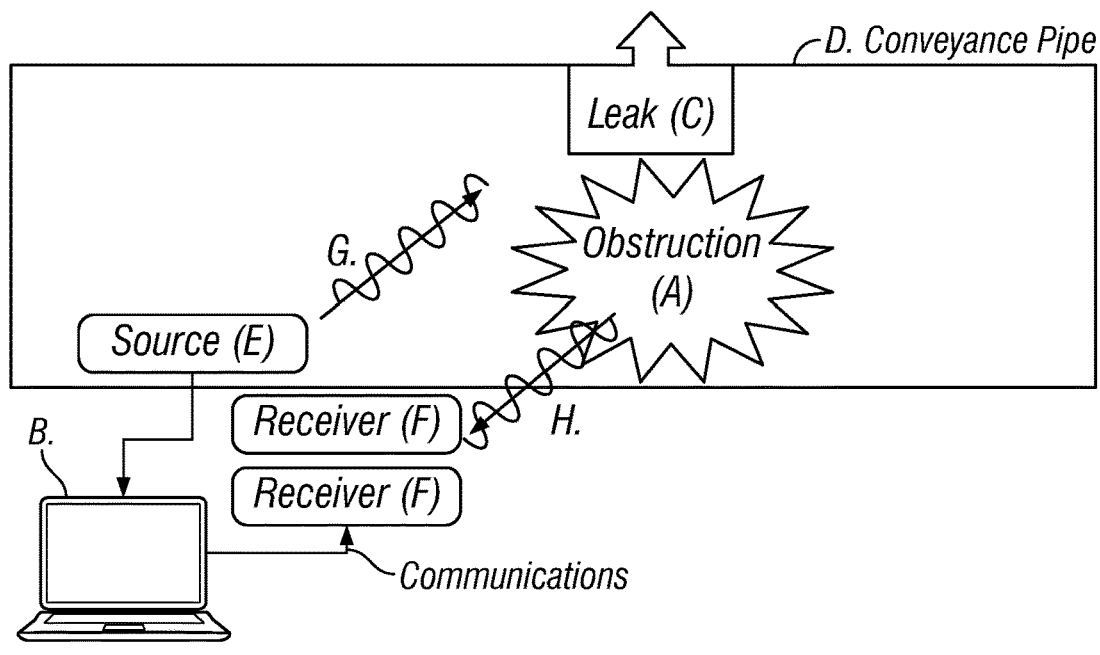
FIG. 10 is a schematic diagram of an embodiment of a method and system for locating obstructions and leaks in conveyance pipe using a single internal source with multiple external receivers.

FIG. 10 is a schematic diagram of an embodiment of a method and system for locating obstructions and leaks in conveyance pipe using a single internal source with multiple external receivers. The system includes an emitter (E) that is operable to send a signal or signals (G) within the conveyance pipe (D). Once the signal interacts with the obstruction (FIG. A) or a leak (C), a reflected signal (H) will be sent back to the receivers (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 11:
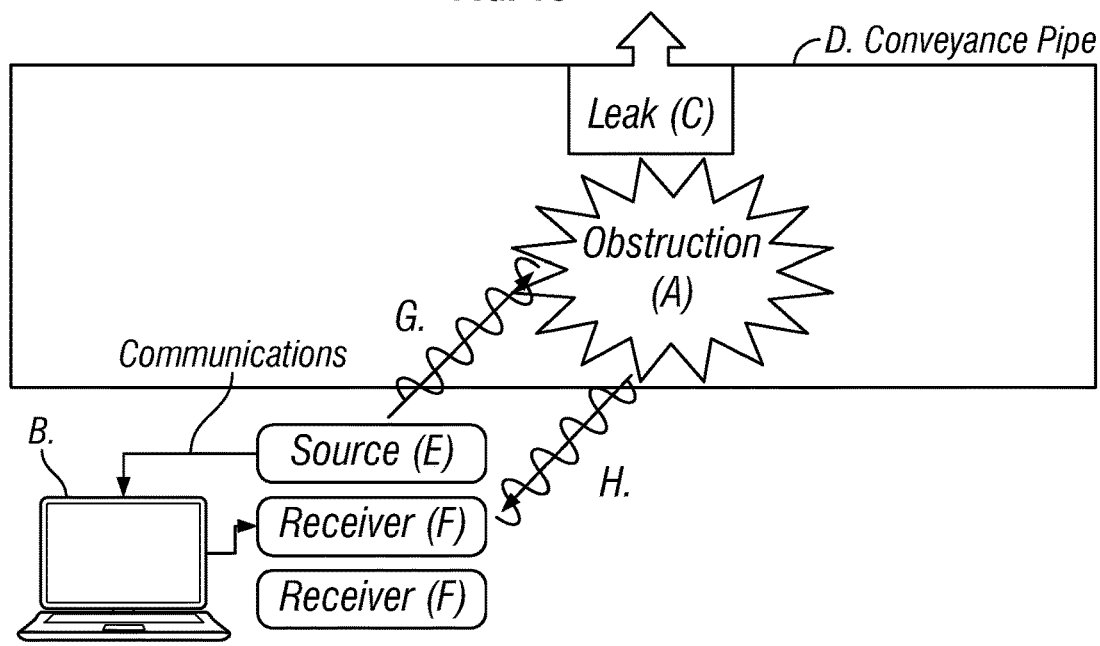
FIG. 11 is a schematic diagram of an embodiment of a method and system for locating obstructions and leaks in conveyance pipe using a single external source with multiple external receivers.

FIG. 11 is a schematic diagram of an embodiment of a method and system for locating obstructions and leaks in conveyance pipe using a single external source with multiple external receivers. The system includes an emitter (E) that is operable to send a signal or signals (G) external to the conveyance pipe (D). Once the signal interacts with the obstruction (A) or a leak (C), a reflected signal (H) will be sent back to the receivers (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Multiple Sources with Single Receiver

Figure 12:
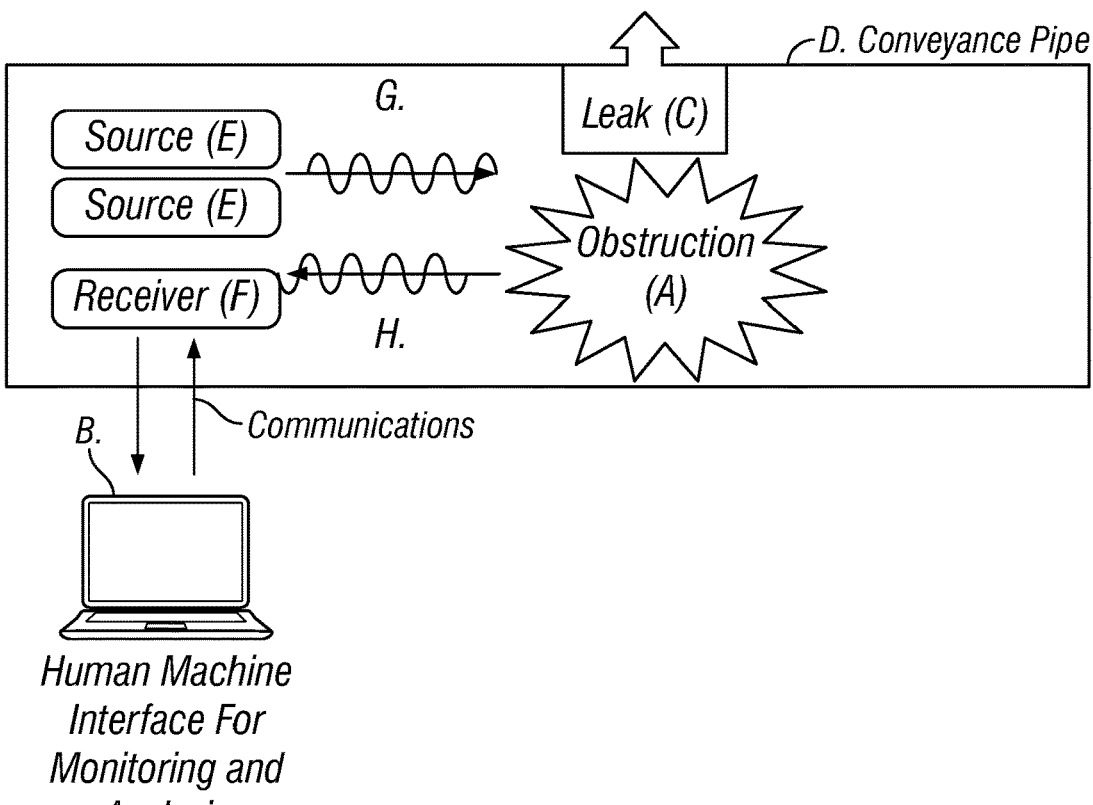
FIG. 12 is a schematic diagram of an embodiment of a method and system for locating obstructions and leaks in conveyance pipe using multiple internal sources with a single internal receiver.

FIG. 12 is a schematic diagram of an embodiment of a method and system for locating obstructions and leaks in conveyance pipe using multiple internal sources with a single internal receiver. The system includes emitters (E) that are operable to send a signal or signals (G) within the conveyance pipe (D). Once the signal interacts with the obstruction (A) or a leak (C), a reflected signal (H) will be sent back to the receiver (F) within the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 13:
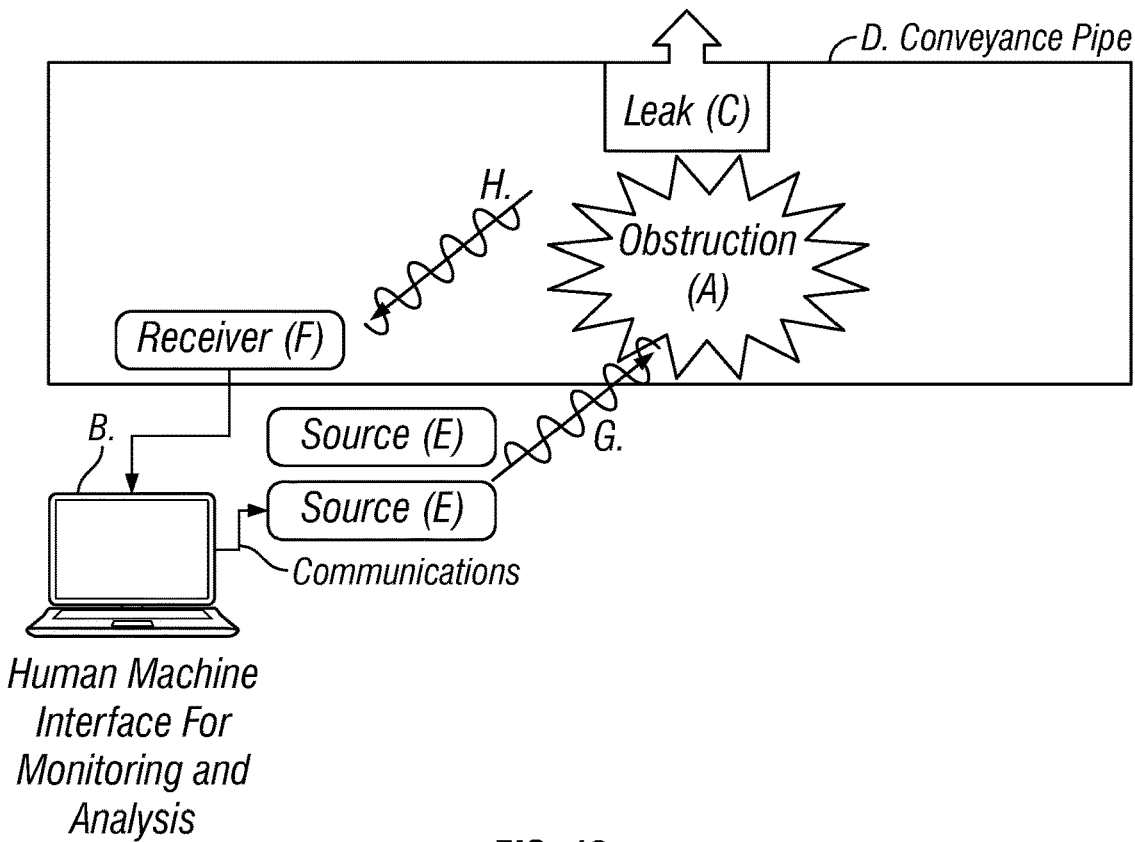
FIG. 13 is a schematic diagram of an embodiment of a method and system for locating obstructions and leaks in conveyance pipe using multiple external sources with a single internal receiver.

FIG. 13 is a schematic diagram of an embodiment of a method and system for locating obstructions and leaks in conveyance pipe using multiple external sources with a single internal receiver. The system includes emitters (E) that are operable to send a signal or signals (G) external to the conveyance pipe (D). Once the signal interacts with the obstruction (A) or a leak (C), a reflected signal (H) will be sent back to the receiver (F) within the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 14:
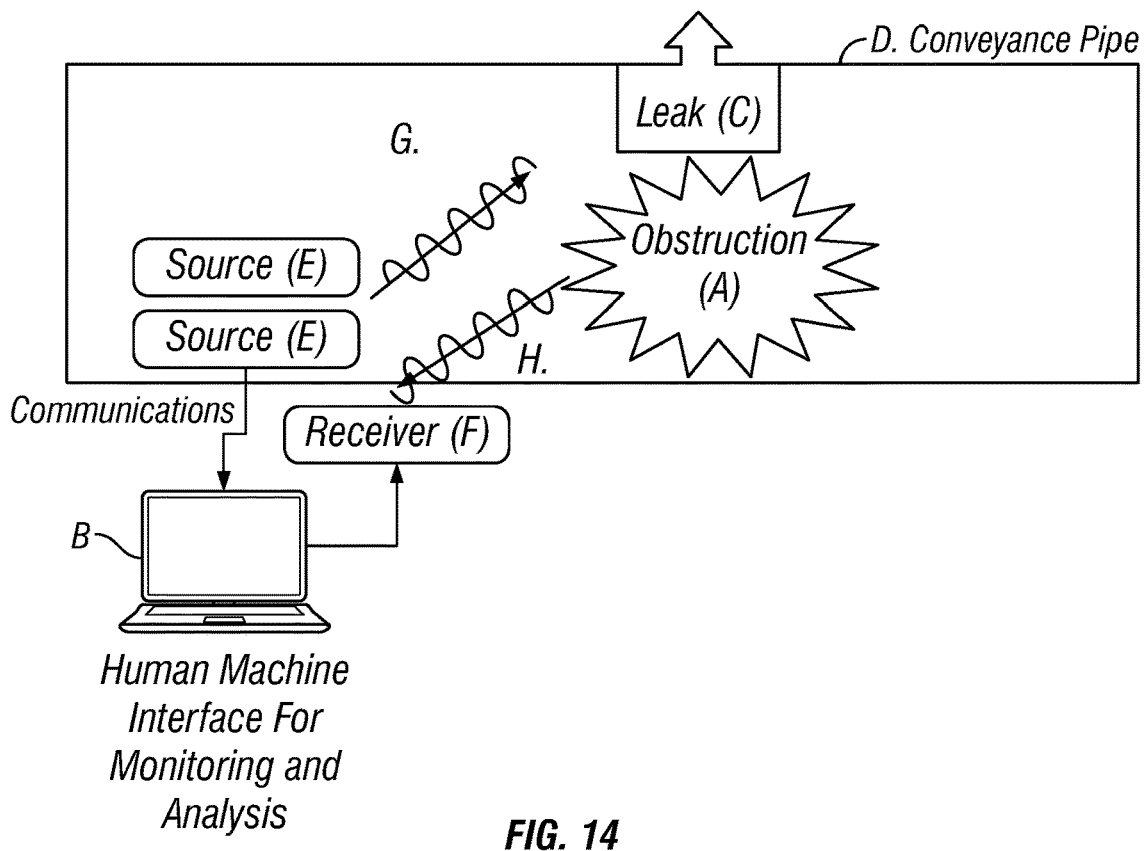
FIG. 14 is a schematic diagram of an embodiment of a method and system for locating obstructions and leaks in conveyance pipe using multiple internal sources with a single external receiver.

FIG. 14 is a schematic diagram of an embodiment of a method and system for locating obstructions and leaks in conveyance pipe using multiple internal sources with a single external receiver. The system includes emitters (E) that are operable to send a signal or signals (G) within the conveyance pipe (D). Once the signal interacts with the obstruction (A) or a leak (C), a reflected signal (H) will be sent back to the receiver (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 15:
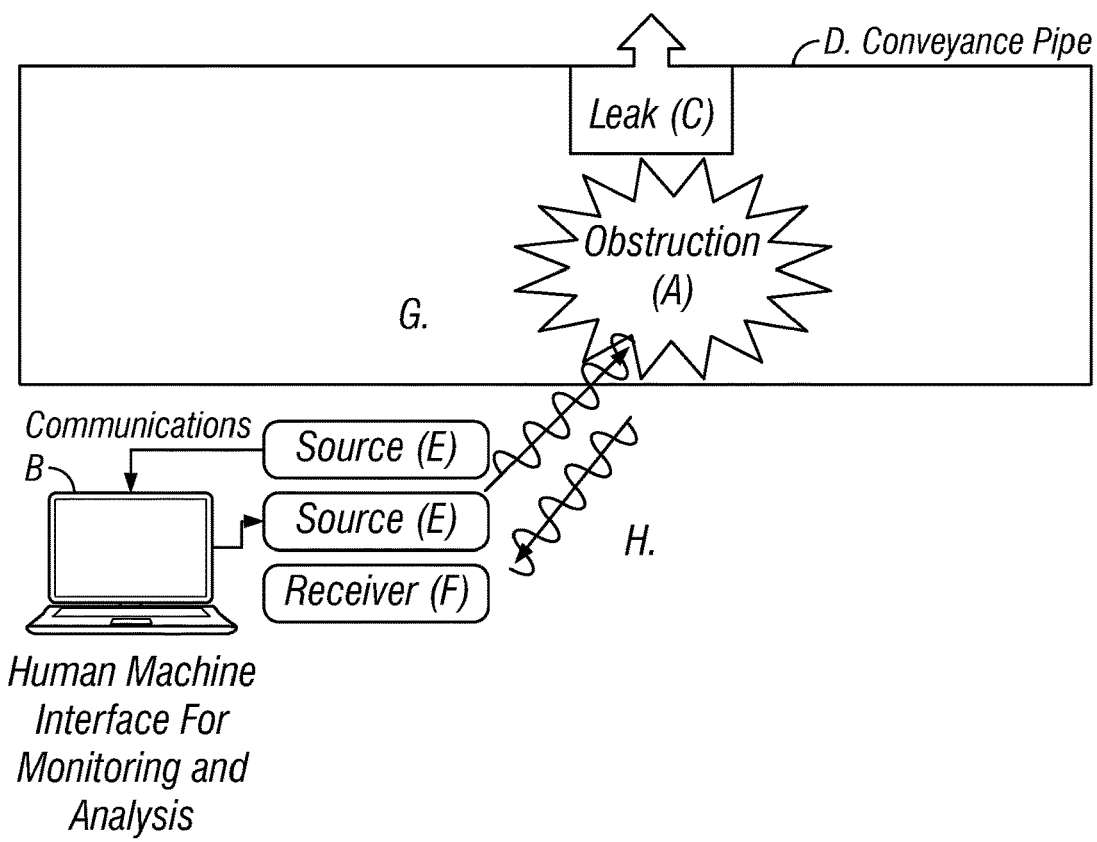
FIG. 15 is a schematic diagram of an embodiment of a method and system for locating obstructions and leaks in conveyance pipe using multiple external sources with a single external receiver.

FIG. 15 is a schematic diagram of an embodiment of a method and system for locating obstructions and leaks in conveyance pipe using multiple external sources with a single external receiver. The system includes emitters (E) that are operable to send a signal or signals (G) external to the conveyance pipe (D). Once the signal interacts with the obstruction (A) or a leak (C), a reflected signal (H) will be sent back to the receiver (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Multiple Sources with Multiple Receivers

Figure 16:
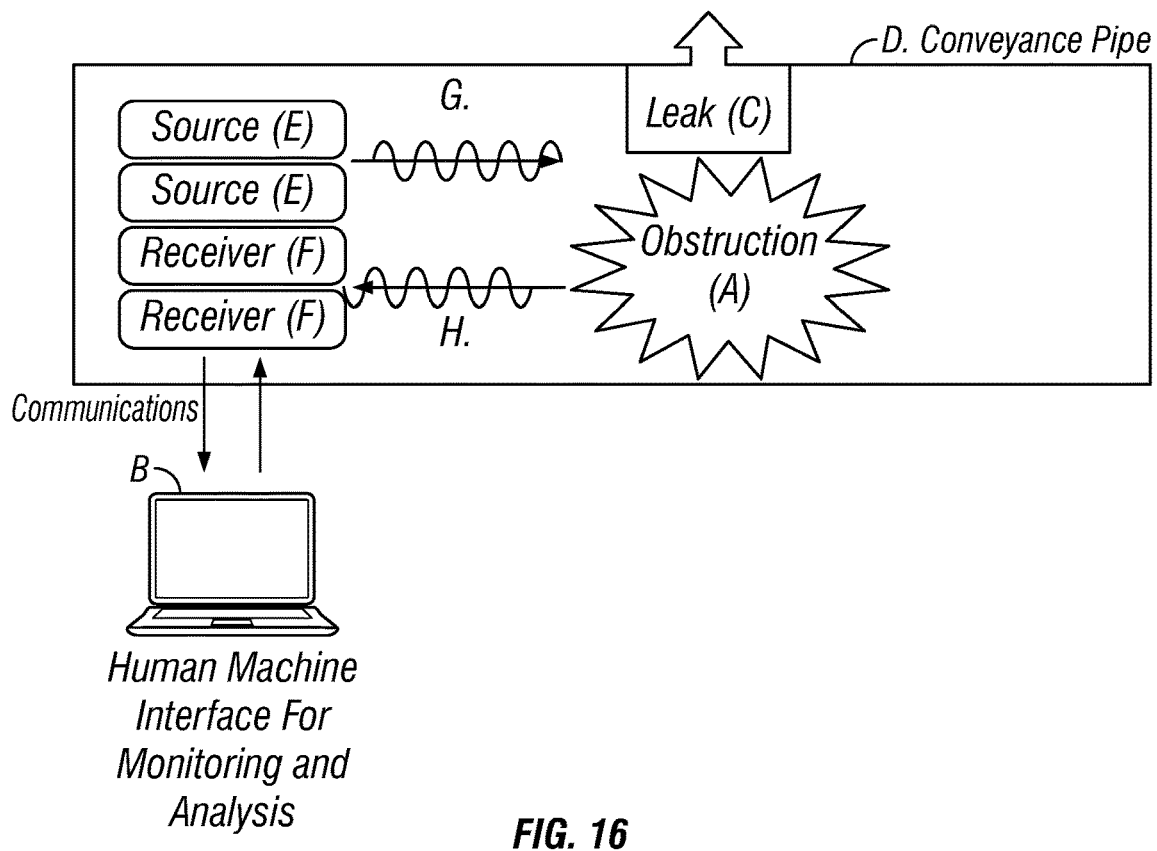
FIG. 16 is a schematic diagram of an embodiment of a method and system for locating obstructions and leaks in conveyance pipe using multiple internal sources with multiple internal receivers.

FIG. 16 is a schematic diagram of an embodiment of a method and system for locating obstructions and leaks in conveyance pipe using multiple internal sources with multiple internal receivers. The system includes emitters (E) that are operable to send a signal or signals (G) within the conveyance pipe (D). Once the signal interacts with the obstruction (A) or a leak (C), a reflected signal (H) will be sent back to the receivers (F) within the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 17:
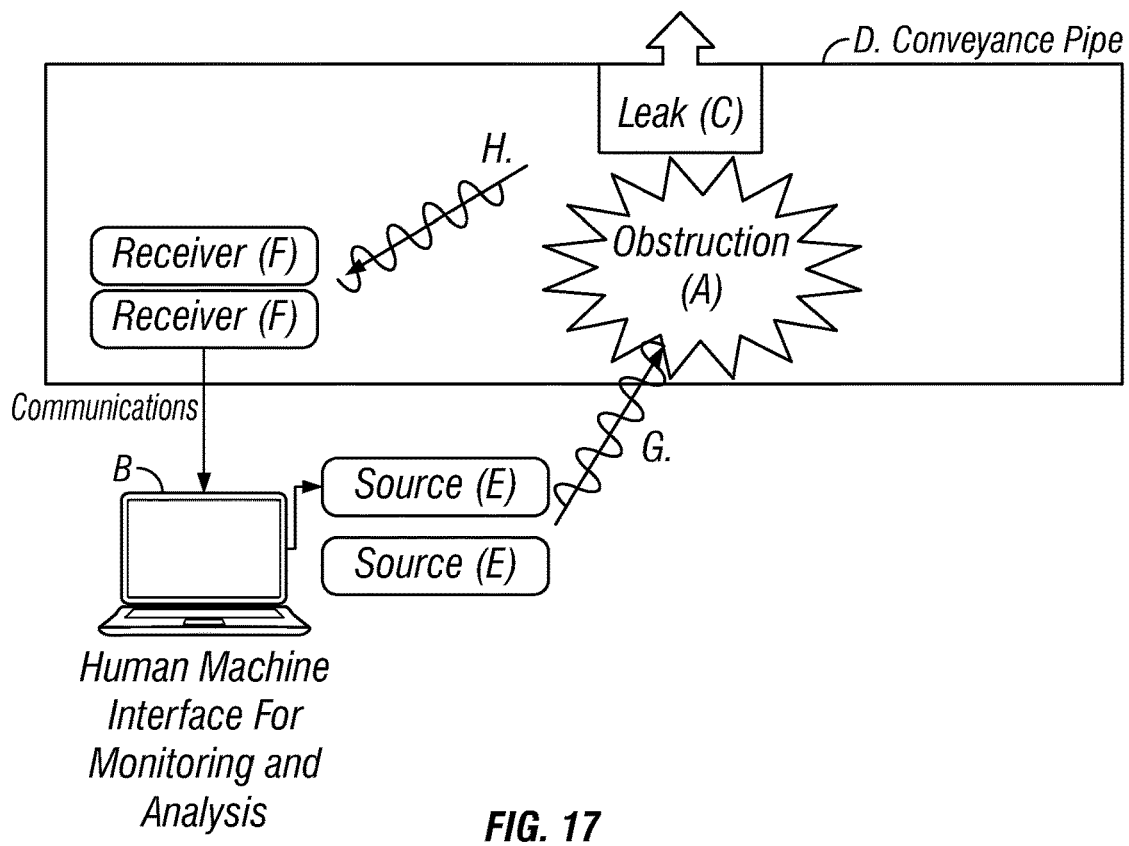
FIG. 17 is a schematic diagram of an embodiment of a method and system for locating obstructions and leaks in conveyance pipe using multiple external sources with multiple internal receivers.

FIG. 17 is a schematic diagram of an embodiment of a method and system for locating obstructions and leaks in conveyance pipe using multiple external sources with multiple internal receivers. The system includes emitters (E) that are operable to send a signal or signals (G) external to the conveyance pipe (D). Once the signal interacts with the obstruction (A) or a leak (C), a reflected signal (H) will be sent back to the receivers (F) within the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 18:
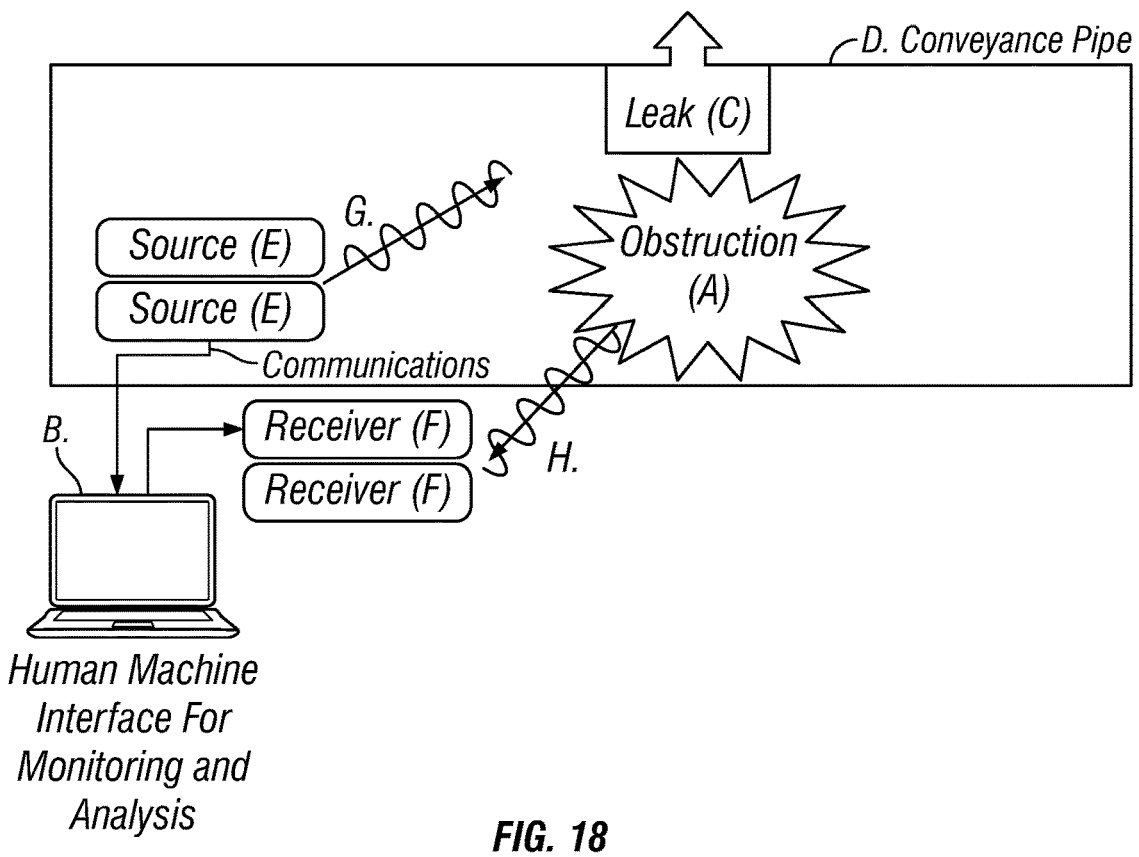
FIG. 18 is a schematic diagram of an embodiment of a method and system for locating obstructions and leaks in conveyance pipe using multiple internal sources with multiple external receivers.

FIG. 18 is a schematic diagram of an embodiment of a method and system for locating obstructions and leaks in conveyance pipe using multiple internal sources with multiple external receivers. The system includes emitters (E) that are operable to send a signal or signals (G) within the conveyance pipe (D). Once the signal interacts with the obstruction (A) or a leak (C), a reflected signal (H) will be sent back to the receivers (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Figure 19:
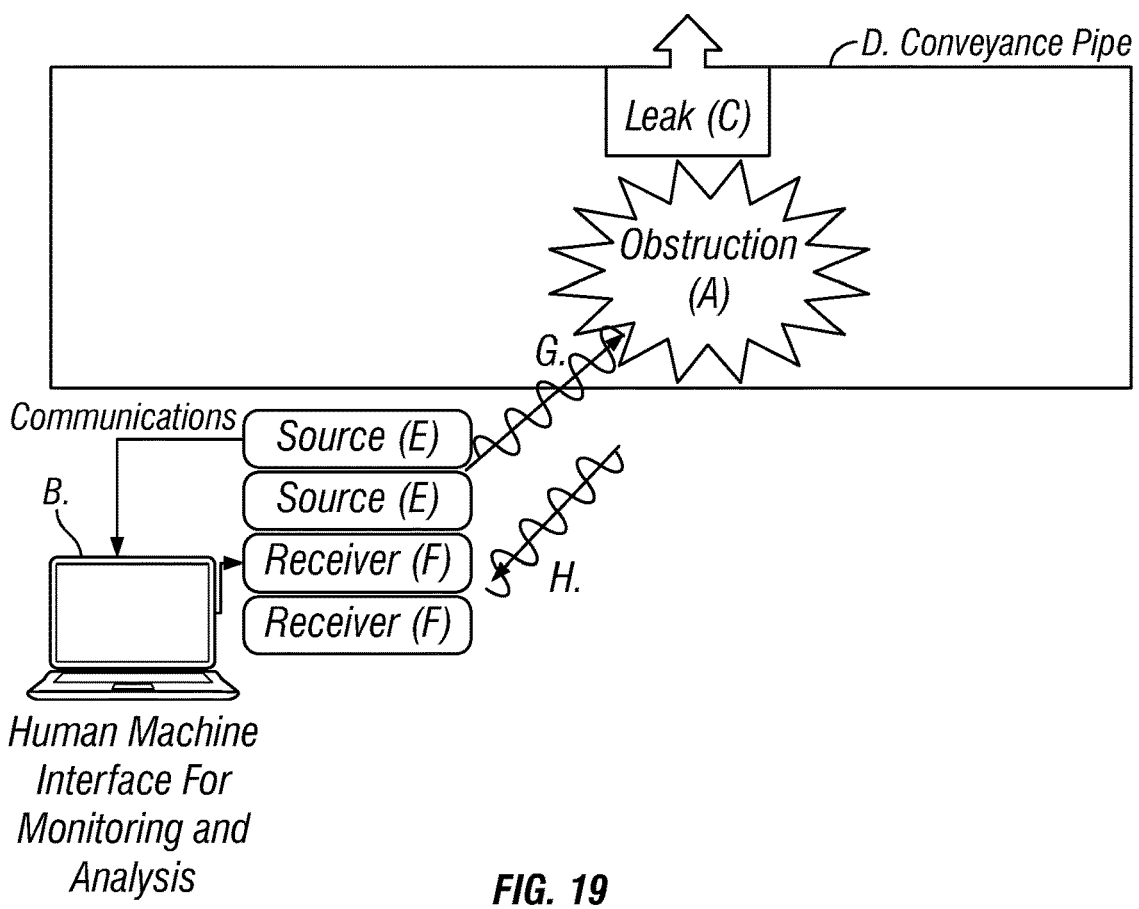
FIG. 19 is a schematic diagram of an embodiment of a method and system for locating obstructions and leaks in conveyance pipe using multiple external sources with multiple external receivers.

FIG. 19 is a schematic diagram of an embodiment of a method and system for locating obstructions and leaks in conveyance pipe using multiple external sources with multiple external receivers. The system includes emitters (E) that are operable to send a signal or signals (G) external to the conveyance pipe (D). Once the signal interacts with the obstruction (A) or a leak (C), a reflected signal (H) will be sent back to the receivers (F) external to the conveyance pipe. This returned signal is analyzed by software located in the local or remote computer systems (B) used for monitoring and analysis. The resulted software calculation in the computer systems will determine the location of the obstruction or leak as discussed above. In addition, the local or remote computer system will display the location of the obstruction or leak as determined by the software calculations.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a computer or computer system may include a non-transitory computer readable medium that comprises instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While compositions and methods are described herein in terms of "comprising" various components or steps, the compositions and methods can also "consist essentially of" or "consist of" the various components and steps.

Unless otherwise indicated, all numbers expressing quantities in the present specification and associated claims are to be understood as being modified in all instances by the term "about." Accordingly, unless indicated to the contrary, the numerical parameters are approximations that may vary depending upon the desired properties sought to be obtained by the embodiments of the present invention. At the very least, and not as an attempt to limit the application of the doctrine of equivalents to the scope of the claim.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A system for locating an obstruction or leak in a metallic conveyance comprising:
  an emitter located inside the conveyance and operable to emit a first acoustic signal between 1 kHz and 24 kHz for a low range and a second acoustic signal between 180 KHz and 220 kHz for a high range through the conveyance;
  a receiver located inside the conveyance and operable to receive reflected acoustic signals from the first and second acoustic signals reflecting from the obstruction or leak; and a processor programmed to analyze the received reflected signals and determine the location of the obstruction or leak in the conveyance.

2. The system of claim 1, wherein the emitter comprises an acoustic emitter and the receiver comprises an acoustic receiver.

3. The system of claim 1, further comprising at least one of multiple emitters or multiple receivers.

4. The system of claim 1, wherein the emitter is operable to emit the first and second acoustic signals longitudinally through the conveyance.

5. The system of claim 1, wherein the emitter is operable to emit the first and second signals perpendicularly through the conveyance.

6. The system of claim 1, wherein the processor further comprises a machine-learning algorithm trainable to compare the reflected signals from the first and second acoustic signals to determine the location of the obstruction or leak in the conveyance.

7. The system of claim 1, wherein the processor is further programed to filter noise from the received reflected signals.

8. A method of locating an obstruction or leak in a metallic conveyance comprising:
   emitting a first acoustic signal between 1 kHz and 24 kHz for low range and emitting a second acoustic signal between 180 kHz and 220 kHz for high range through the conveyance from an emitter located inside the conveyance;
   receiving reflected acoustic signals from the first and second acoustic signals being reflected from the obstruction or leak with a receiver located inside the conveyance; and
   analyzing the received reflected signals using a processor to determine the location of the obstruction or leak in the conveyance.

9. The method of claim 8, further comprising emitting the first and second acoustic signals from an acoustic emitter and receiving the reflected acoustic signals with an acoustic receiver.

10. The method of claim 8, further comprising emitting the first and second acoustic signals longitudinally through the conveyance.

11. The method of claim 8, further comprising emitting the first and second acoustic signals perpendicularly through the conveyance.

12. The method of claim 8, further comprising:
   emitting the signals from multiple emitters located inside the conveyance; or
   receiving the reflected signals with multiple receivers located inside the conveyance.

13. The method of claim 8, further comprising training a machine-learning algorithm to determine the location of the obstruction or leak in the conveyance based on a comparison of the reflected signals from the first and second acoustic signals.

14. The method of claim 8, wherein analyzing the received reflected signals using the processor further comprises filtering out noise from the received reflected signals using a noise filtering method.

* * * * *